Aug. 14, 1951
T. J. J. HOEK
2,564,433
RECOVERING OF PYRIDINE FROM ACID SALT
SOLUTIONS WHICH CONTAIN PYRIDINE
Filed Nov. 26, 1948
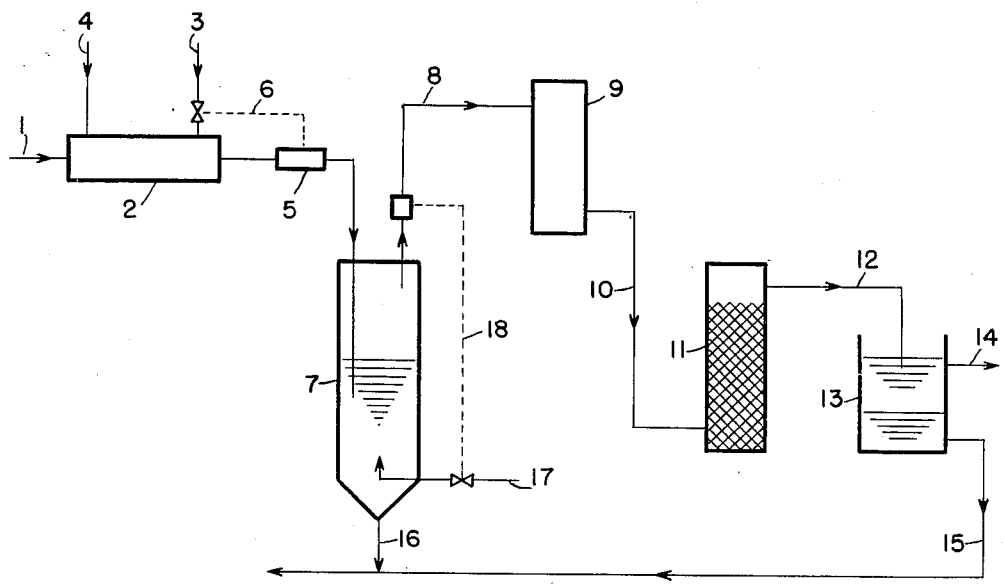
Inventor
THEODORUS J. J. HOEK
Cushman, Darby & Cushma
Attorneys Patented Aug. 14, 1951

2,564,433

UNITED STATES PATENT OFFICE 2,564,433

RECOVERING OF PYRIDINE FROM ACID SALT SOLUTIONS WHICH CONTAIN PYRIDINE

Theodorus J. J. Hoek, Geleen, Netherlands, assignor to De Directie van de Staatsmijnen in Limburg, Heerlen, Netherlands Application November 26, 1948, Serial No. 61,954
In the Netherlands November 27, 1947

7 Claims. (Cl. 260—290)

This invention relates to the recovering of pyridine from acid salt solutions which contain pyridine.

A special feature of the invention is a continuous process for the said recovering of pyridine as hereinafter will be illustrated. While the invention is applicable to the recovering of pyridine from any acid salt solution containing the same, a preferred application of the invention is the recovering of pyridine from acid salt solutions obtained in the purification treatment of crude gas formed in the coking of carbonaceous materials, and therefore the invention will be illustrated with regard to this preferred application.

The crude gas, which is formed at the coking of coal, contains a small percentage of pyridine and homologues of pyridine such as picoline, lutidine, quinoline, etc., which form together the so-called pyridine-bases and will be indicated in the application by the collective noun of "pyridine."

A part of this pyridine and especially the higher boiling fractions gets into the tar. However, a considerable part of the lower boiling fractions passes through the precoolers and tar-separators together with the gas and is bound with the ammonia to sulphuric acid during the direct or indirect sulphate of ammonia process.

This occurs inside the saturators, where the crude gas is passed through a saturated solution of sulphate of ammonia, which contains 5–10% of free sulphuric acid. In this way the amount of sulphate of pyridine in the saturator liquid increases continuously, up to 2.5%, at which percentage the pyridine begins to separate from the liquid.

On account hereof the separated sulphate of ammonia will be contaminated with pyridine and this fact, also in connection with the fact that pyridine has a considerable commercial value, makes that a separation of the latter compound from the saturator liquid is not only desirable but attractive too.

Various methods of recovering pyridine from solutions of sulphate of ammonia have been described.

In the U. S. patent specification 1,274,998 a suggestion is made to transfer the whole of the contents of the saturator into a neutralising distilling apparatus as soon as the amount of pyridine of the liquid has arrived at the critical value at which pyridine begins to separate, subsequently to neutralise the solution with preheated, and, if necessary, dried ammonia-gas, to remove the so freed pyridine by distillation and to treat the distillate with ammonia-gas, causing a formation of two liquid layers, the upper one whereof chiefly consists of pyridine.

According to the U. S. patent specification 1,274,999 it is also possible to treat the neutralised saturator liquid directly with an appropriate oil in order to cause the pyridine to dissolve by this oil and, subsequently, to separate the oil layer from the other part of the liquid.

Another process of freeing the saturator liquid from pyridine is depicted in the U. S. patent specification 1,414,441, where the liquid is not neutralised, but where only its percentage of acid is reduced to about 2% of free acid by stopping the supply of acid to the saturator as soon as the separated sulphate of ammonia begins to be contaminated with pyridine, whereas, subsequently, the pyridine is removed from the acid solution by means of a steam distillation, after a preliminary saturation of the liquid with sulphate of ammonia at the boiling temperature. In the distillate the pyridine is then separated from the water by saturating the liquid with sulphate of ammonia and by removing the upper liquid layer which contains pyridine.

These methods present the serious drawback that they are discontinuous and that during the removal of the pyridine the saturator is to be put out of service or has to be emptied into another vessel.

According to the U. S. patent specification 2,311,234 this problem is solved by a method which enables a removal of the pyridine from the saturator liquid during a continuous process.

To this effect a part of the contents is continuously withdrawn from the saturator, is freed from sulphate of ammonia crystals and is made alkaline in a distilling-vessel. The so freed pyridine is removed by distillation, whereas at the same time provision is made for the escaping vapour to contain a sufficient amount of volatile alkali and gaseous acid, forming together a salt which is soluble in water, in order to render the salt concentration of the distillate so high that the same splits into two layers, the top one whereof chiefly consists of pyridine.

To this effect, in particular, the clarified saturator liquor is continuously transferred into a vessel, where it is treated with ammoniagas, which also contains carbon dioxide. On account of the heat of the reaction the temperature of the liquid rises considerably, whereas heating is applied too, if necessary, so that a vapour escapes which contains pyridine, ammonia and carbon dioxide beside water vapour.

In a corresponding dephlegmator the concentrations of the ammonia and of the carbon dioxide are adjusted in such a way by regulating the temperature of the escaping vapour that, after condensation, a solution of ammonium carbonate is formed of a sufficient strength for causing the condensate to divide into two layers.

However, this method too presents drawbacks. The required equipment is not simple and rather extensive. The saturator liquid has to be transferred into a separate neutralising distilling-vessel, whereas a preliminary removal of the solid sulphate of ammonia should take place in a settling-tank in order to avoid that the sulphate of ammonia would be contaminated with the hydroxides, sulphides etc., formed when alkalizing and distilling the saturator liquid.

The dephlegmator and the condensor should have considerable dimensions whereas the temperatures in these apparatus should be controlled carefully.

These drawbacks are eliminated by the new method in accordance with the invention, which enables one to recover pyridine for practically hundred percent from an acid salt solution which contains pyridine in a simple and wholly continuous process, and which can be performed with the acid of a simple equipment needing but little supervision.

According to the invention a continuous flow of the acid salt solution which contains pyridine is continuously neutralised, the freed pyridine is removed by means of and with steam from the neutral liquid treated in this way, the vapours which hereby escape are condensed, the aqueous solution of pyridine thus obtained is saturated with a salt readily soluble in water and the layers of liquid then formed are continuously separated from each other.

The new process in many respects works perfectly when neutralising by means of liquid ammonia.

On the annexed diagram the invention will be illustrated as it is applied in the process of recovering pyridine from the saturator liquid of the by-product coke-plant. At the same time the advantages of the present process and some special favourable arrangements will be pointed out.

A flow of saturator liquid, which is saturated as to sulphate of ammonia, which contains about 5% of free sulphuric acid and 12–15 grams of pyridine per litre and which has been preheated to about 85° C., passes through pipe 1 into a somewhat wider pipe 2, where it is neutralised by means of liquid ammonia which is continuously supplied through pipe 3. At the same time water is supplied through pipe 4 in order to prevent that too much sulphate of ammonia crystallises and causes obstructions.

The neutralisation by means of liquid ammonia takes place in the pipe itself. This fact presents a large advantage over the usual methods practised till now, since it is not necessary to transfer the liquid into large and expensive neutralising-vessels, as is necessary when neutralising with gaseous ammonia.

Besides, in this way the drawback which always occurs when neutralising or alkalising by means of gases or vapours, viz. that the residual gases carry off pyridine and so produce losses, is eliminated.

The supply of the ammonia is adjusted by means of an adjustable valve, in such a way that the liquid after neutralisation has a pH of about 7.0. This can be done in an entirely automatical way by means of an appropriate connection between the pH-meter 5 and the above mentioned valve (6).

It has appeared that, when applying the new method, the liquid does not need to be made alkaline as prescribed in the U. S. patent specification 2,311,134, but that at a pH of about 7.0 already all pyridine can be recovered from the solution. On account hereof the danger of a formation of hydroxides, sulphides etc., which contaminate the solution and the crystals of sulphate of ammonia present in the same and which may cause possible obstructions, decreases. Therefore, when applying the new method it is not necessary to clarify the saturated liquid in a separate settling-tank before the neutralisation (compare the last-mentioned patent specification), but the saturator liquid may be passed through the apparatus together with the crystals of sulphate of ammonia which are floating in the same.

The neutralised solution flows at a temperature of about 85° C. into the extractor 7, where a preliminary separation takes place: by means of steam which is supplied through pipe 17 the pyridine is extracted in the vapour phase from the solution.

This extraction by means of steam has proved to be essential. When trying to distil the pyridine directly from the neutralised solution after the same has split into two layers, other compounds (especially mercaptans, sulphides and the like) appear to pass over at the same time causing obstructions in the pipes. Besides, this preliminary purification of the pyridine by means of the steam distillation presents the advantage that the crude pyridine obtained during the process may be purified in one single operation, which is not possible when obtaining the crude pyridine by means of the method with a direct distillation.

It appears that the vapour when leaving the extractor should have a temperature of 95–96° C. in order to remove the entire amount of pyridine from the residual solution. At lower temperatures, e. g. at 93° C. considerable quantities of pyridine are left behind in the liquid. The supply of steam should therefore conform with this requirement, which can be accomplished by means of a device which adapts this supply automatically to the temperature of the escaping vapours (18).

The vapour which escapes from the extractor is condensed in the cooler 9, the condensate, an aqueous solution of pyridine, passes through pipe 10 to the saturator 11, where it is pressed upwards through a column of solid sulphate of ammonia.

This method of saturating the liquid with sulphate of ammonia is extraordinarily simple and warrants a continuity of the process. At intervals the column is replenished with solid sulphate at the top.

The emulsion of pyridine in a saturated solution of sulphate of ammonia passes continuously through pipe 12 into the separating vessel 13, where it splits into two layers. The top layer of liquid consisting chiefly of pyridine is continuously discharged through a pipe 14 towards a tank destined for the crude pyridine, whereas the bottom layer, a saturated solution of sulphate of ammonia, is returned continuously through the pipe 15, towards the saturator. The last-mentioned flow is joined, via the pipe 16, by the solution which flows continuously from the bottom of the preseparator-extractor 7.

In a device, in which 1–2 m.³ of saturator liquid is treated per hour, a cylindrical extractor of a diameter of 1 m. and a height of 2.5 m. connected with a cylindrical cooler of a diameter of 1 m. and a height of 1.5 m. proved to be adequate for the purpose of removing the pyridine for practically 100 percent from the saturator liquid. Also in this respect the new method means an important progress in the respective branches of chemical technics.

The foregoing description is for purposes of illustration and not of limitation, and it is therefore my intention that the invention be limited only by the appended claims or their equivalents.

I claim:

1. A continuous process for recovering a pyridine base from acid salt solutions containing the same which comprises continuously neutralizing a stream of said acid salt solution by injection of a stream of liquid ammonia into said acid salt solution, steam distilling the resulting neutralized mixture, condensing the resulting vapors forming an aqueous solution of pyridine, saturating the aqueous solution with a water soluble salt whereby the solution divides into two individual layers and continuously separating said layers from one another.

2. A process as claimed in claim 1, wherein said water soluble salt is ammonium sulfate.

3. A process as claimed in claim 1, wherein the injection of the liquid ammonia is accomplished in a confined space with the stream of acid salt solution passing therethrough at a velocity less than the velocity with which the solution enters said confined space.

4. A process as claimed in claim 3, wherein said injection of liquid ammonia is accomplished by introducing the liquid ammonia into the feeding pipe of the acid solution at an enlarged section of the feeding pipe.

5. A process as claimed in claim 1, wherein said saturating of aqueous solution with a water-soluble salt is accomplished by passing the solution through a column of solid ammonium sulfate.

6. A process as claimed in claim 1, wherein water is added to the reacting materials during said neutralization step in such quantity that no ammonium sulfate precipitates from the mixture.

7. A continuous process for recovering a pyridine base from acid salt solutions of tar bases obtained in the purification treatment of crude gas formed in the cooling of carbonaceous materials which comprises continuously neutralizing a stream of said acid salt solution to a pH of about 7.0 by injection of a stream of liquid ammonia into a stream of said salt solution in a confined zone in which the fluid flow velocity is lower than the velocity of the solution entering and leaving said confined zone, steam distilling the resulting neutralized mixture to give vapors having a temperature of at least 93° C., condensing the resulting vapors forming an aqueous condensate comprising a solution of pyridine, saturating said condensate with ammonium sulfate by passing it through a column of solid ammonium sulfate, allowing the resulting mixture to divide into two individual layers and continuously separating said layers from one another.

THEODORUS J. J. HOEK.

REFERENCES CITED

The following references are of record in the file of this patent:

UNITED STATES PATENTS

| Number | Name | Date |
|---|---|---|
| 1,274,998 | Dodge | Aug. 6, 1918 |
| 1,414,441 | Sperr | May 2, 1922 |
| 1,416,205 | Huff | May 16, 1922 |
| 2,311,134 | Schutt | Feb. 16, 1943 |

OTHER REFERENCES

Meredith, Gas Journal, Feb. 1942, pp. 166–169.